Nov. 27, 1934. J. H. JOHANSON 1,981,955
FLUID OPERATED HAND TOOL
Filed July 6, 1933
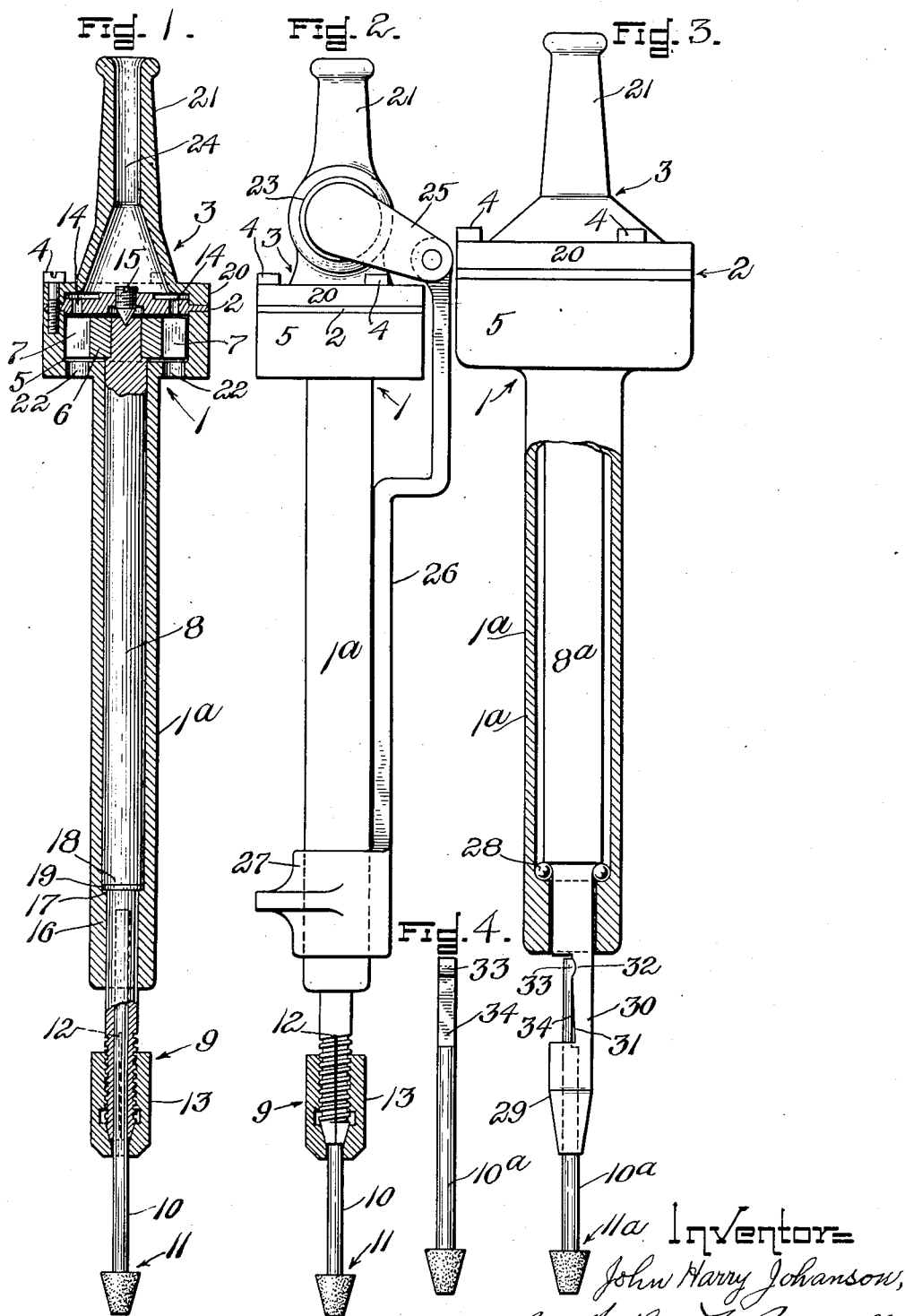

Patented Nov. 27, 1934

1,981,955

UNITED STATES PATENT OFFICE 1,981,955

FLUID OPERATED HAND TOOL

John Harry Johanson, Waltham, Mass., assignor of one-half to Henry T. Nelson, Boston, Mass.

Application July 6, 1933, Serial No. 679,214

2 Claims. (Cl. 253—3)

My invention relates to a fluid operated hand tool for use in cutting, grinding, polishing and the like operations and it has for its object to provide an improved and efficient tool of this class which will be of simple and inexpensive construction.

To these ends I have provided a novel fluid operated hand tool of the class indicated having the peculiar features of construction and mode of operation set forth in the following description, the several novel features of the invention being particularly pointed out and defined in the claims at the close thereof.

In the accompanying drawing:—

Figure 1 is a central longitudinal sectional view, somewhat enlarged, of a pneumatic hand tool constructed in accordance with my invention.

Figure 2 is an elevation of a pneumatic hand tool constructed like that shown in Figure 1 except for the addition of manually operated valve mechanism for controlling the supply of air to the tool.

Figure 3 illustrates a third form of the invention.

Figure 4 is an elevation of the cutter, or work engaging implement, of the tool shown in Figure 3.

The embodiment of my invention illustrated in Figure 1 comprises a housing made up of three sections 1, 2 and 3 fastened rigidly together by means of three screws 4. The inner portion of section 1 serves as a handle and is of elongate tubular form as shown at 1a while the inner portion thereof is enlarged and formed to provide a cylindrical chamber 5 within which is arranged a turbine rotor 6 constructed with radial vanes 7.

The hub of rotor 6 is fixedly mounted upon the inner end of a spindle or shaft 8 which extends loosely through, and projects beyond, the tubular handle portion 1a, the outer end portion of said spindle being tubular and constructed as a chuck 9 adapted to receive within it and to grip the shank or stem 10 of a work engaging implement or cutter 11. This outer end portion is split longitudinally as at 12, Figs. 1 and 2, and is also exteriorly threaded to receive upon it an interiorly threaded nut 13.

The end of the outermost split portion of spindle 8 is made conical to co-operate with a complementary conical surface provided upon the interior of nut 13, as is usual in chucks, so that by rotation of said nut 13 the shank 10 can be clamped within the spindle or released for removal.

In the drawing the implement 11 is shown as provided at its outer end with an abrasive head but as will be clear other implements provided with heads of different kinds may be provided for use in the tool or the outer end of the work engaging implement may be constructed in any desired fashion according to the service it is to perform.

The section 2 of the housing is a disk-like partition wall constructed with a relatively thin outer annular marginal portion that is clamped tightly between sections 1 and 3, said marginal portion being formed with apertures through which the screws 4 extend.

This intermediate section 2 serves as a head for one end of chamber 5 and is formed with a circular series of air inlet ports 14 disposed opposite the path of the vanes 7 of rotor 6. The wall of chamber 5 at the opposite end of the latter is formed with a circular series of air outlet ports 22 also disposed opposite the path of the vanes 7.

It is a feature of this invention that the outlet ports 22 are constructed and arranged to direct the exhausted air toward the implement 11 and the work so that dust and chipping are blown off from the latter as fast as produced which enables the workman to see the effect of the implement upon the work while the tool is in use and to follow any working lines with which the latter may be marked.

The axis of rotor 6 is maintained coincident with the axis of chamber 5 by means of a pivot abutment screw 15 adjustably mounted in a threaded aperture provided at the middle of section 2 of the housing while the opposite reduced end portion of spindle 8 is journaled within a bearing 16 provided adjacent to the outer end of the tubular handle portion 1a of the housing.

At the inner end of the bearing 16 the interior of the tubular portion 1a is formed with an annular shoulder 17 between which and an opposed shoulder 18 on spindle 8 is arranged a fiber thrust washer 19.

The section 3 of the housing is of straight tubular form and at its inner end is constructed with an apertured flange that is clamped against the intermediate section 2 by the screws 4, while the outer end portion of said section 3 is formed as a nipple 21 adapted to be telescopically coupled to the delivery end of a flexible conduit by which the interior of section 3 is connected with a supply of air under pressure. Suitable valve means, not shown in Figure 1, is provided by means of which the supply of air to the tool may be turned on and off.

In the form of my invention illustrated in Figure 2 of the drawing the section 3 of the housing is constructed as a valve body within which is rotatably confined a valve member 23 which controls the port 24, Figure 1, of the supply conduit that is provided through said section 3.

Valve member 23 is provided with an arm 25 to which is pivotally connected one end of a longitudinally disposed laterally resilient stem 26 projecting from one end of a sleeve or band 27 that is slidably mounted upon the elongate handle portion 1a of the housing section 1.

The sleeve or band 27 may be shifted longitudinally on handle portion 1a by one of the fingers of the hand that holds the tool thereby to open or close the supply conduit.

In Figure 3 of the drawing the spindle 8a of the tool is supported near its lower or outer end by a radial and thrust ball bearing 28 provided within the handle portion 1a of the housing.

The portion of spindle 8a, of Figure 3, that is outside of handle portion 1a is made at its outer end with a tubular end portion 29 connected with the body portion of the spindle by a neck 30 that is off-set laterally with respect to the axis of the spindle. The neck 30 is provided upon its inner side with a slightly oblique flat face 31 that is formed with a transverse notch 32 to receive a boss 33 provided at the free end of the stem 10a of a work engaging implement 11a thereby to secure the stem 10a in position.

The side of stem 10a that is adjacent to the flat oblique face 31 is also made flat as at 34 and the engagement of these two flat surfaces assists in holding the stem and spindle against relative rotative displacement while the tool is in use. At the same time the engagement of boss 33 with the socket 32 holds said two parts against relative longitudinal displacement.

When the implement 11a of Figure 3 is inserted in the tool its stem 10a is shoved endwise through the tubular portion 29 and as it passes beyond the latter said inner end is flexed sidewise by the slightly oblique face 31 until the boss 33 snaps into the socket 32. When it is desired to remove the implement 11a this may be accomplished by pulling outwardly upon the same.

What I claim is:

1. A hand tool of the character described having, in combination, a straight tubular rear end housing section having its outer end portion exteriorly formed as a nipple to be coupled telescopically to a flexible conduit through which fluid under pressure is supplied to the tool and having its inner end portion enlarged interiorly and exteriorly; a forward straight tubular end housing section having its inner end portion enlarged interiorly and exteriorly to provide a chamber for the reception of a rotor; an intermediate partition wall section having its marginal portion disposed between the inner proximate ends of said tubular end sections; means fastening said two end sections together so as to clamp only said marginal portion between said inner proximate ends; a tool-holding spindle rotatably mounted within said forward tubular end section; a rotor within said chamber and fixed to the inner end of said spindle, and a pivot abutment screw for holding said rotor in position within said chamber, said abutment screw being adjustably supported by said intermediate partition wall, the said intermediate partition wall being formed with air inlet ports disposed at one side of said rotor and said forward tubular end section being formed with air outlet ports disposed upon the opposite side of said rotor in close proximity thereto.

2. A hand tool of the character described constructed in accordance with claim 2 wherein said two tubular end sections are disposed with their axes parallel and alined at opposite sides of the middle of said intermediate partition wall so that the axis of the tool as a unit is alined with the axis of said flexible conduit when applied thereto.

JOHN HARRY JOHANSON.